P. Jr. & R. Hoop.

Hot Blast Furnace.

No. 3,269.

Reissued Jan. 19, 1869.

Witnesses:
C. A. Pettit
J. C. Kennon

Inventors:
P. and R. Hoop
By Munn & Co.
Attorneys.

N. PETERS, PHOTO-LITHOGRAPHER, WASHINGTON, D. C.

United States Patent Office.

P. HOOP, JR., AND R. HOOP, OF BERLIN CROSS-ROADS, OHIO.

*Letters Patent No.* 83,382, *dated October* 27, 1868; *reissue No.* 3,269, *dated January* 19, 1869.

IMPROVED HOT-BLAST FURNACE.

The Schedule referred to in these Letters Patent and making part of the same.

*To all whom it may concern:*

Be it known that we, P. HOOP, Jr., and R. HOOP, of Berlin Cross-Roads, in the county of Jackson, and State of Ohio, have invented a new and useful Improvement in Hot-Blast Furnaces; and we do hereby declare that the following is a full, clear, and exact description of the construction and operation of the same, reference being had to the accompanying drawings, making a part of this specification, in which—

Figure 1:
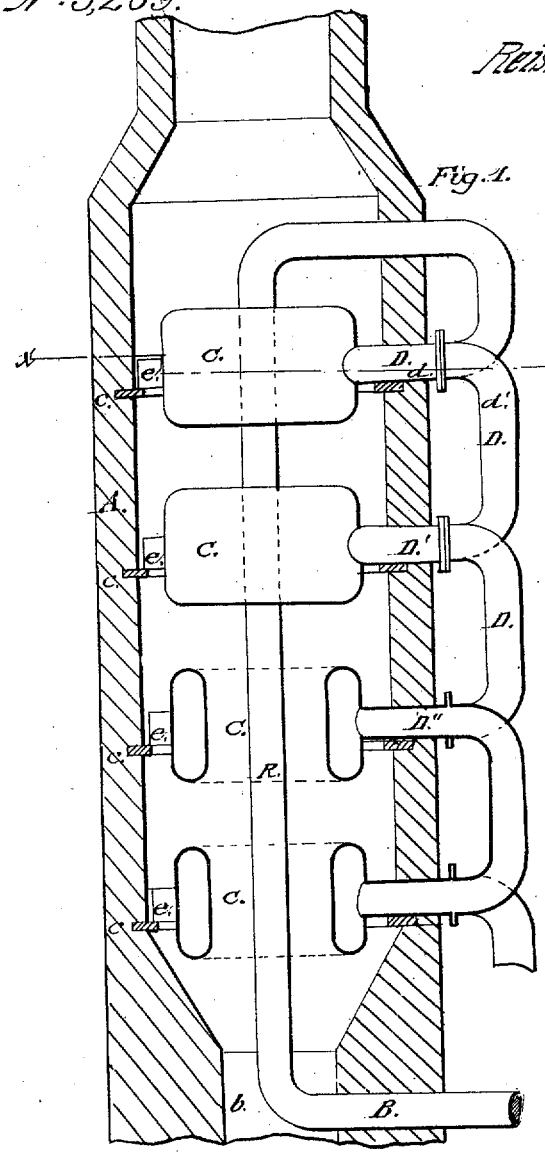
Figure 1 is a vertical section through a chimney containing our apparatus, the two lower rings and the lower connecting-pipe being also in section.

This invention consists in passing the blast of air, to be heated for fanning the flame of a puddling-furnace, through a series of hollow rings placed one above another in a chimney, the products of combustion beneath rising through the rings, and the blast circulating in the rings one after another, said rings being connected by means of pipes for the transmission of the air-current from one to another, which pipes pass outside of the chimney, and are arranged to be removed and replaced at pleasure.

It should be understood that we do not claim to be the original employers of rings for this purpose, being well aware that their use, in analogous manners, is old.

In the drawings, A represents a chimney of ordinary construction, through a suitable orifice, *b*, in the foundation of which, passes a pipe, B, of a size proportioned to the quantity of the blast which its function is to convey. Said pipe passes vertically upward through the chimney.

Figure 2:
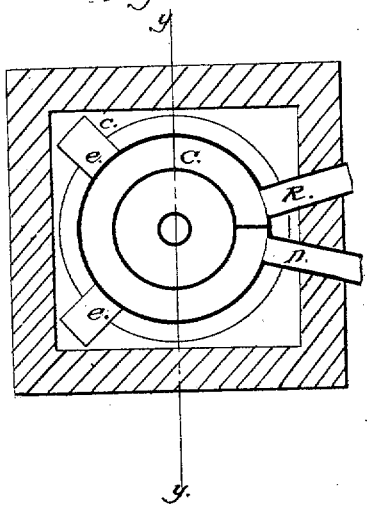
Figure 2 is a horizontal section through the line *x x* of fig. 1.

At the proper point, near the bottom of the chimney, is laid in the masonry a square plate, *c*, with a circular aperture through it, as shown in fig. 2, on which plate rest lugs *e*, two or more, said lugs projecting from a ring, *c*, of a diameter, from outside to outside, some inches less than that of the aforesaid aperture in the plate *c*, within which aperture is placed the ring. Similar plates, *c*, are placed at convenient distances, one above another, in the chimney, on which rest similar rings C, as many as may be desired.

The pipe B passes upward, conveying the blast through the rings C, and, when it has passed the topmost one, it makes a sharp turn to the horizontal, and, passing out through the wall of the chimney, runs straight downward, and then inward, through the wall of the chimney again, and into the upper ring C, discharging its current, which, making the circuit of the ring, finds egress through the pipe D, which conducts it to the next lower ring, and so on until, on its exit from the lower ring, it is ready for the furnace.

The pipes D D′ D″, &c., which connect the rings, are each formed in three sections, the upper and lower of which project directly from the rings, through the wall of the chimney, and the middle one of which connects the said upper and lower sections. The points of connection, as shown in fig. 1, are all on the outside of the chimney. The middle sections being the ones most liable to fracture, it is obvious that a damage to one of them may be repaired by replacing it, without stopping the furnace to cool the blast, or in any way damaging the chimney.

It will be seen that each ring rests upon its own foundation, and is entirely disconnected from the others. In the chimneys in common use, in which rings are employed, the weight of all above rest upon the lower, and herein we claim an improvement.

Any ring that requires removal from any cause, may be taken out without damage to the chimney.

The effects of expansion and contraction are confined to each ring and its pipes, and thus prevented from extending to the others, while the middle sections of the connecting-pipes, being outside of the chimney, suffer no damage from fire, a fertile source of ruin in the methods now in use. Another good effect, resulting from placing the pipes so much on the outside, is, that the flame and currents which heat the rings, have a free access to them. We also believe that our improvements conduce to the durability of the oven.

Having thus described our invention,

What we claim as new, and desire to secure by Letters Patent, is—

1. The rings C, provided with the lugs *e*, in combination with the foundation-plates *c*, as and for the purpose described.

2. The rings C, in combination with the pipes D, made in three or more sections, and having their middle portions outside the chimney, as and for the purpose specified.

3. In connection with an apparatus for heating air for the purposes specified, in which several heating-vessels or chambers are employed, connecting said heaters by a pipe or pipes, D D′, running either partly or wholly outside of the chimney or oven, substantially as and for the purposes described.

4. In a hot-blast apparatus, in which the heaters are connected by pipes, D D′ D″, the arrangement of the joints of said pipes outside of the chimney or oven, so as not to be exposed to the heat thereof, substantially as described.

P. HOOP, JR.
R. HOOP.

Witnesses:
BENJ. F. STEARNS,
JNO. D. BROWN.